June 8, 1926.
E. T. CHARLTON
ROUTE MAP AND THE LIKE
Filed June 2, 1923
1,587,506
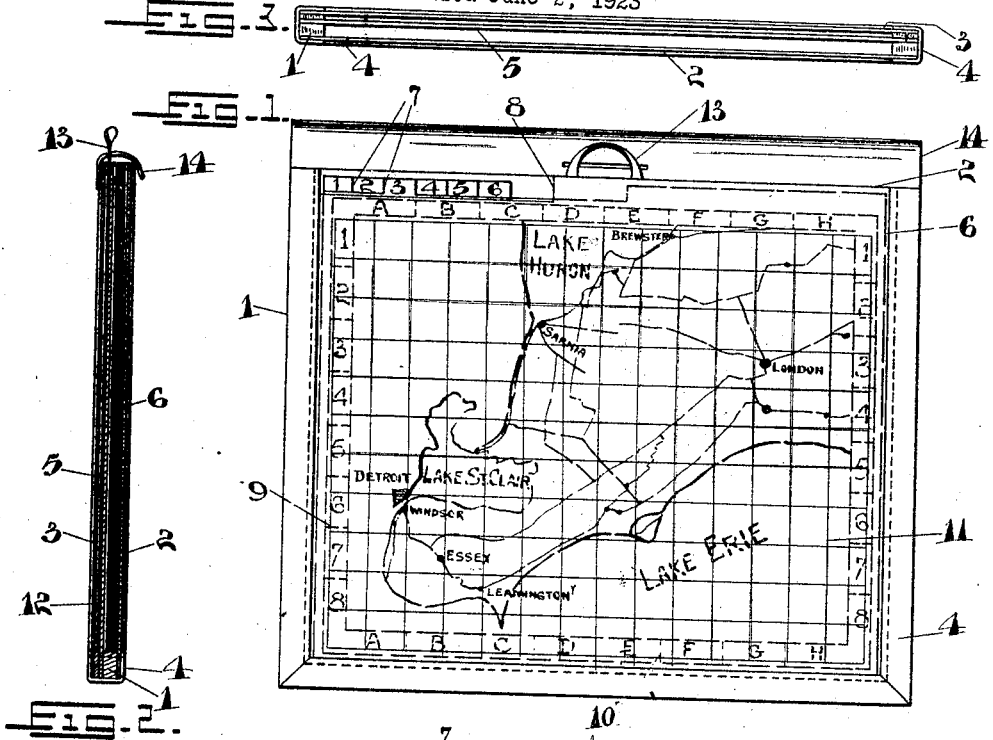
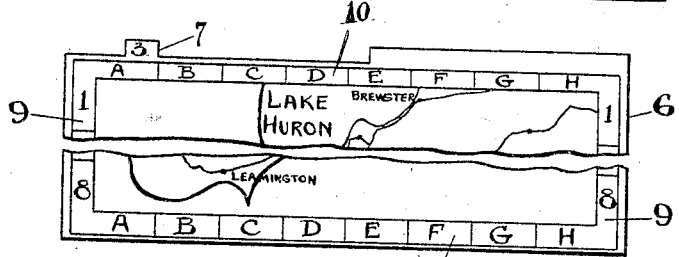

Patented June 8, 1926.

1,587,506

UNITED STATES PATENT OFFICE.

EMANUEL THOMAS CHARLTON, OF LONDON, ONTARIO, CANADA.

ROUTE MAP AND THE LIKE.

Application filed June 2, 1923. Serial No. 643,015.

The object of my invention is to provide convenient means to enable a tourist to plan and follow any desired route, and which can easily be handled and used in a motor or other vehicle.

I attain my object by means of the constructions hereinafter described and illustrated in the accompanying drawings in which Fig. 1 is a front elevation of my device;
Fig. 2 a vertical section of the same;
Fig. 3 a plan view of the holder with the map sections and index removed;
Fig. 4 an elevation of one of the maps partly broken away; and
Fig. 5 a plan view of the index.

The holder is formed of the three-sided frame 1 to which are secured the transparent front and back panels 2 and 3, the three sides of the holder being finished off with a suitable binding 4.

Intermediate the transparent back and front is positioned a diaphragm 5 which divides the holder into back and front pockets, the front pocket being preferably of greater depth than the back pocket.

The map of a given district, say, for example, the Province of Ontario, Canada, is divided up into sections 6. Each section is provided adjacent its upper side with an identification symbol. Preferably these symbols are displayed on tabs 7 and the tabs carrying the symbols are so positioned on their respective sections as to form a longitudinal series adjacent the upper edge of the front pocket when the map sections are in position therein. Any given map is thus readily identified so that it may be pulled out and given position at the front of the pocket immediately behind the transparent front.

The map sections are so numbered that any given section forms a continuation at one side or another of map sections bearing the next higher or lower number or symbol in the series.

Preferably the transparent front 2 is cut away, as indicated at 8, to expose the tabs 7. It is not, of course, absolutely essential that the upper edge of the map sections be cut away to leave a projecting tab, though this is preferable, as the identifying symbol may be displayed in its proper position in the series.

To enable any given place on a map section to be readily found from the index, two opposite margins of each map section bear a series of numbers 9 or other suitable indicia and the other two sides bear a series of letters 10 or other suitable indicia.

The transparent front is also preferably ruled with cross lines 11 dividing the surface up into squares, each of which represents a predetermined number of miles to the side. This enables distances on the map to be roughly estimated. One or more index cards 12 are provided, which are received in the back pocket of the holder. Any suitable arrangement of the names of places may be employed, but opposite the name of each place must appear the symbol indicating the particular map section and a letter and numeral which will enable the position of the place to be found on the map section in a well known manner.

To enable the device to be hung on the instrument board of a car or in any other convenient situation, I secure to the diaphragm 5 a hang-up 13. To prevent wet getting into the holder, I prefer to provide a flap 14 secured to the back of the device so as to hinge thereon and adapted to extend over the top as shown particularly in Fig. 2. An opening is provided through this flap through which the hang-up may extend.

What I claim is:—

1. The combination of a holder open at one side and provided with a transparent front, a transparent back, and an intermediate diaphragm dividing the space between the back and front into two separate pockets; and a hang-up secured to the diaphragm.

2. The combination of a holder open at one side and provided with a transparent front, a transparent back, and an intermediate diaphragm dividing the space between the back and front into two separate pockets; a flap hinged to one of the transparent members and adapted to fold over to protect the openings of the pockets; and a hang-up secured to the diaphragm, the flap having an opening therein for the passage of the hang-up.

Signed at London, Ontario, this 22d day of May, 1923.

EMANUEL THOMAS CHARLTON.